Sept. 30, 1958 A. W. HUTSON Re. 24,542
KITE
Original Filed June 23, 1955
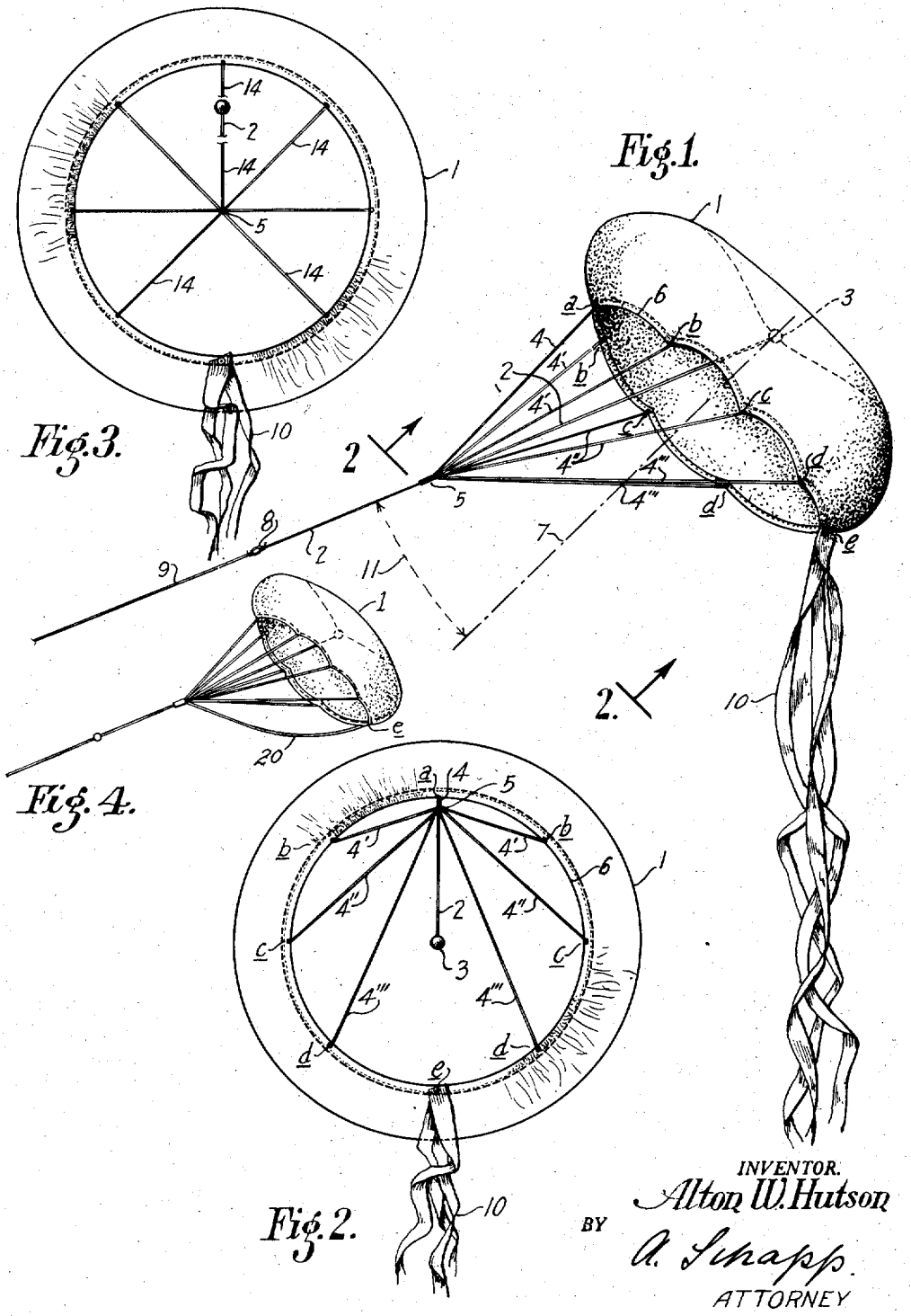
INVENTOR.
Alton W. Hutson
BY
A. Snapp
ATTORNEY United States Patent Office Re. 24,542
Reissued Sept. 30, 1958

24,542

KITE

Alton W. Hutson, Richmond, Calif.

Original No. 2,804,276, dated August 27, 1957, Serial No. 517,431, June 23, 1955. Application for reissue October 14, 1957, Serial No. 690,170

6 Claims. (Cl. 244—153)

Matter enclosed in heavy brackets [ ] appears in the original patent but forms no part of this reissue specification; matter printed in italics indicates the additions made by reissue.

The present invention relates to improvements in kites, and has particular reference to kites made in the manner of a parachute or umbrella.

In order to make a kite of this character fly successfully, it becomes necessary to arrange the control elements in such a manner that they hold the umbrella-shaped body at a tilt with respect to the direction of the wind, so as to produce a proper lifting effect.

It has been proposed heretofore to obtain the desired effect by means of struts and rigid members incorporated in the device, but the provision of such members tended, of course, to increase the weight of the kite, and furthermore interfered with the packaging of the kites, since the latter could not be confined into a small space.

In the present invention, it is proposed to provide a kite of the character described, with control elements consisting exclusively of flexible strings, so that the entire kite may be readily folded into a small package, such as might be conveniently carried in the pocket of the user.

It is further proposed to arrange the flexible control elements in such a manner that they still cause the body of the kite to assume the desired tilting angle with respect to the direction of the wind.

Further objects and advantages of my invention will appear as the specification proceeds, and the new and useful features of my kite will be fully defined in the claims attached hereto.

The preferred forms of my invention are illustrated in the accompanying drawing, forming part of this application, in which:

Figure 1 shows a perspective view taken from the side of my kite while in flight;

Figure 2, an end view of the kite as shown from lines 2—2 of Figure 1;

Figure 3, a view similar to that of Figure 2, and illustrating a modified form of my invention, following the same principle; and Figure 4, a view similar to that of Figure 1, and illustrating another modified form of my invention.

While I have shown only the preferred forms of my invention, it should be understood that various changes or modifications may be made within the scope of the claims hereto attached, without departing from the spirit of the invention.

Referring to the drawing in detail, and first to the form shown in Figures 1 and 2, my kite comprises in its principal features, a parachute-like body 1, a draw-string 2 attached to the body portion in the center thereof, as at 3, and a number of shroud lines 4 secured upon the rim of the body at spaced points and connected to the draw-string at a point spaced from the body, as at 5.

The body is constructed of flexible, plastic material of any suitable type, and, in my preferred form is made of a sheet of material approximately thirty-six inches in diameter.

In the manufacture of my kite, the rim, shown at 6, is drawn in and suitably seamed to produce a substantially semi-spherical body, as shown.

The axial center-line of this hollow body is indicated by the line 7. The draw-line 2 is attached to the body at the axial center-line, and is formed, at its free end, with a loop 8 for attachment of the conventional type line 9.

The rim of the hollow body is secured to the draw-string by means of the shroud lines 4, which are arranged in such a manner as to impart a desired angularity to the body when in flight as compared with its axis 7.

For this purpose, I divide the rim into eight sections, providing eight equally-spaced points of attachment for the shroud lines. Any one of these eight points may be selected to serve as the upper center of the rim.

Assuming that the point a has been selected for this purpose, it is connected to the draw-string 2 by the first shroud line 4. Proceeding in opposite directions to the next two points of attachment b, they are connected to the point 5 by the next pair of shroud lines 4'.

Proceeding further, the next points of attachment marked c are secured to the point 5 by the shroud lines 4'', and the last pair of points of attachment marked d are attached to point 5 by the shroud lines 4'''.

The last point of attachment, marked e, which is directly opposite point a, is not attached to any shroud line, so as to leave the lower portion of the hollow body relatively free for flexing purpose. This point is used, however, for attachment of the tail, indicated at 10.

The shroud lines are dimensioned to progressively increase in length from the starting point a to the last point d, so as to cause the hollow body, or parachute, to naturally assume an angular position with respect to the draw-string when the latter and the shroud lines are drawn tight when the kite is in flight.

This angle is marked at 11, and should preferably be about twenty-two degrees. In my preferred kite, now in use, I make the first shroud line 4 about seventeen inches long, the two next lines 4' approximately the same length, the two succeeding ones 4'', about eighteen inches in length, and the last two lines 4''', about twenty-one inches in length.

The last shroud line, as has been stated, is omitted, but if it were applied, as shown in Figure 4, it would be approximately twenty-nine inches in length, as indicated by the reference character 20, because, in actual flight, the tail end flattens out considerably to allow the wind to spill out and to provide a lifting effect for the hollow body.

It will thus be seen that, when in flight, the parachute will naturally assume an angle of about twenty-two degrees with respect to the draw-string, which places the body of the kite at a tilt with respect to a perpendicular plane, sufficient to allow the wind to produce the desired lifting effect.

A similar effect may be obtained by the arrangement illustrated in Figure 3, in which the shroud lines 14 are all made of the same length, and the point of attachment for the draw-string 2 is shifted from the central point to a point spaced therefrom sufficiently to again produce the desired angle of twenty-two degrees between the axis of the hollow body and the draw-string when the kite is in flight.

It will be seen that in either case, the entire kite is completely flexible, except for some minor attaching fixtures, and may be readily folded into a small package.

While my kite is naturally intended for a toy principally, it can also be used for a signalling device, or for many other purposes, one being, for instance, that of a scarecrow for birds and animals.

My kite can be flown in light wind, as well as in strong winds, and needs no running to get it into flight position.

I claim:

1. A kite comprising a flexible body of generally circular shape, a plurality of shroud lines attached to the periphery of said body in circumferentially spaced relation to each other, there being a main shroud line attached to one point on the periphery of said body with reference to which all the remaining shroud lines are longer, said remaining shroud lines consisting of a plurality of pairs of lines, with the lines of each pair being of equal length and with successive pairs being progressively longer from said one point, the lines of each pair being equidistantly spaced from and on opposite sides of said one point, leaving a substantial extent of the marginal edge of said body, along a portion thereof diametrically opposed to said one point, free to flex and billow while the kite is in flight with said shroud lines taut, said shroud lines being attached to each other at their ends remote from the kite body and means attached to said free marginal edge portion in substantially diametrically opposed relation to said one point for stabilizing said free marginal edge portion of the body to limit the flexing thereof.

2. A kite as defined in claim 1 wherein the peripheral edge of said body is gathered and secured in such gathered condition to present a free edge to which said shrouds are attached which is of less diameter than the maximum diameter of the body whereby the body when filled with air is of generally mushroom shape.

3. The kite as defined in claim 1 wherein said means comprises a ribbon-like tail.

4. The kite as defined in claim 1 wherein said means comprises a further shroud line longer than all of the other shroud lines so as to be normally slack when such other shroud lines are taut and the kite is in use.

*5. A kite comprising a flexible body of general circular shape, a plurality of shroud lines attached to the periphery of said body in circumferentially spaced relation to each other, the shroud lines being arranged in pairs on opposite sides of a starting point on the body, with the shroud lines of each pair being of the same length and equidistant from the starting point, and the shroud lines of successive pairs increasing in length from the starting point toward a second point substantially diametrically opposite the starting point, the shroud lines of the last pair being spaced from said second point so as to leave a substantial extent of the marginal edge of said body on opposite sides of said second point to flex and billow while the kite is in flight with said shroud lines taut, said shroud lines converging toward each other and being connected at their ends remote from said body, and means attached to said body adjacent the marginal edge portion at said second point for stabilizing said marginal edge portion of the body to limit the flexing thereof.*

*6. A kite as defined in claim 5, wherein the remote ends of the shroud lines are connected to a draw string and are related in their respective length and spacing to cause the axis of the flexible body to assume an angle to approximately twenty-two degrees with respect to the draw string when blown up in flight.*

References Cited in the file of this patent or the original patent

UNITED STATES PATENTS

| | | |
|---|---|---|
| 1,406,521 | Ackerman | Feb. 14, 1922 |
| 2,125,198 | Pool | July 26, 1938 |
| 2,358,417 | Quilter | Sept. 19, 1944 |
| 2,434,077 | Lang | Jan. 6, 1948 |
| 2,648,508 | Bell | Aug. 11, 1953 |